June 24, 1947.  T. C. SAYLES  2,423,070
COASTER BRAKE
Filed Feb. 9, 1945
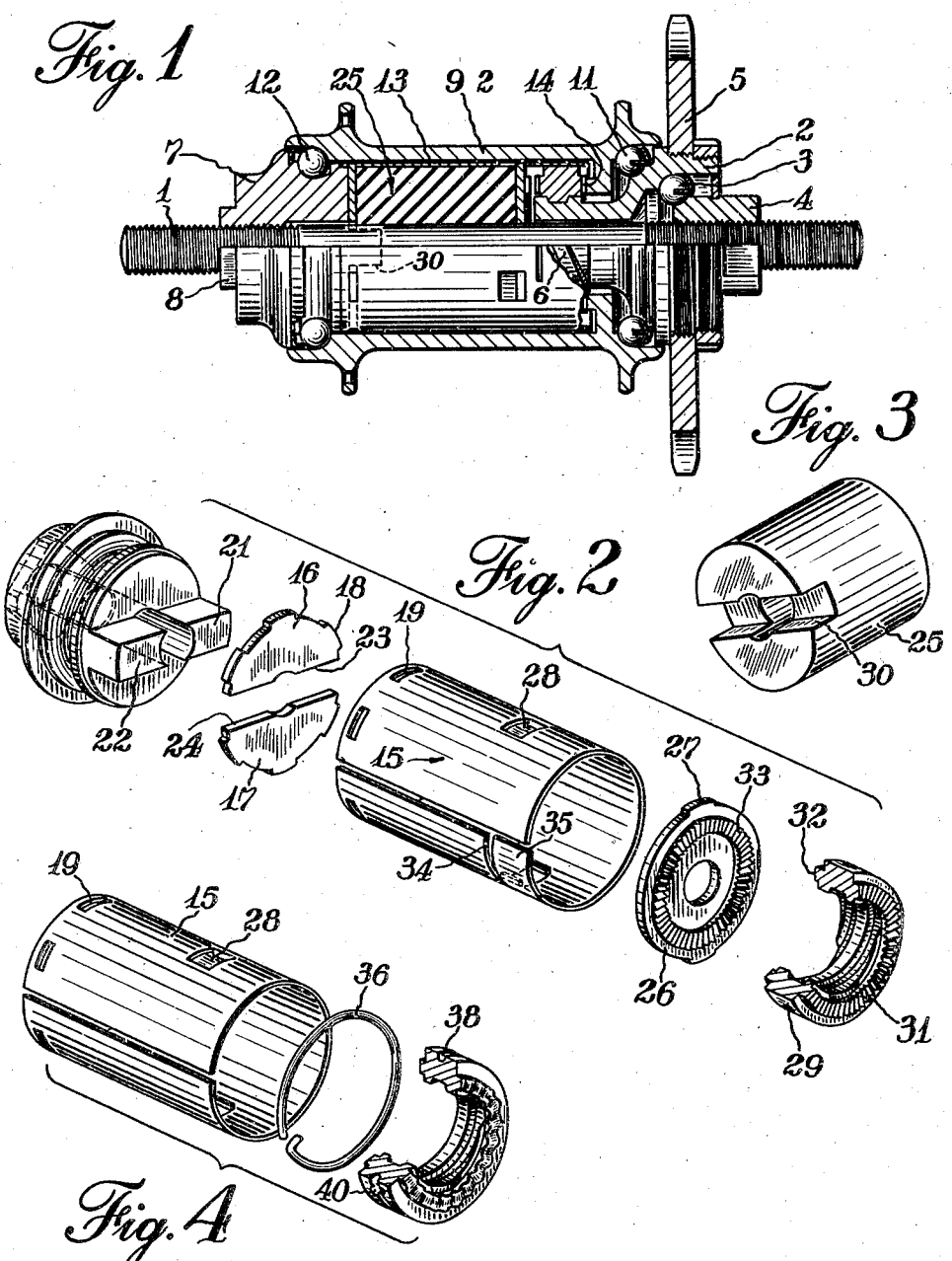
INVENTOR.
BY Theo C. Sayles
Clinton S. Janes
ATTORNEY
WITNESS:
Burr W. Jones Patented June 24, 1947

2,423,070

UNITED STATES PATENT OFFICE 2,423,070

COASTER BRAKE

Theo C. Sayles, Elmira, N. Y., assignor to Bendix Aviation Corporation, South Bend, Ind., a corporation of Delaware Application February 9, 1945, Serial No. 577,065

11 Claims. (Cl. 192—6)

The present invention relates to a hub brake for velocipedes and the like and more particularly to an internal expanding brake in which the expanding member is formed of elastically deformable material.

It is an object of the present invention to provide a novel hub brake which is effective in operation and simple and economical in construction.

It is another object to provide such a device including a brake sleeve, and a member of elastically deformable material for expanding the sleeve into frictional engagement with the interior of the hub to be braked.

It is a further object of the invention to provide such a device including novel means for anchoring the brake sleeve.

It is another object to provide such a device including novel means for expanding the brake sleeve member and for rotating the hub, which means includes a threaded clutch member.

It is another object to provide such a device including novel means for controlling the action of the clutch member.

Further objects and advantages will be apparent from the following description taken in connection with the accompanying drawing in which:

Fig. 1 is a side elevation partly broken away and in section showing a preferred embodiment of the invention;

Fig. 2 is a detail in perspective of the brake sleeve with the actuating and anchoring means therefor, the rubber member being omitted and the parts being shown in disassembled relation;

Fig. 3 is a detail in perspective of the rubber brake expanding member; and

Fig. 4 is a detail in perspective of the brake sleeve and actuating member only, showing another form of retarding means for the threaded actuated member.

In Fig. 1 of the drawing there is illustrated an axle 1 threaded at its ends and adapted to be mounted in a vehicle frame such as the rear fork of a bicycle frame not illustrated. A driving member 2 is journaled on one end of the axle by means of an anti-friction bearing 3 comprising an adjusting cone 4 threaded on one end of the axle. The driving member 2 has a sprocket 5 fixed on one end thereof in any suitable manner, and the opposite end is externally threaded as indicated at 6.

An anchor member 7 is threaded on the other end of the axle 1 and is prevented from rotation by any conventional form of rigid connection with the vehicle frame, utilizing the squared extension 8 of the anchor member. A wheel hub 9 is journaled at its ends on the driving member 2 and anchor member 7 as by means of anti-friction bearings 11 and 12 respectively. The interior of the hub is formed with a cylindrical braking surface 13 and a driving clutch face 14 which is preferably provided with radially extending teeth as illustrated.

An expansible brake member in the form of a split sleeve 15 of suitable material is loosely mounted within the hub 9 and is supported at one end and prevented from rotation by means of a pair of segmental key members 16, 17 having radial projections 18 adapted to enter openings 19 in the brake sleeve. The anchor member 7 is provided with flattened axial projections 21, 22 on which the chordal surfaces 23, 24 of the keys 16, 17 are adapted to rest so as to form a splined connection between the brake sleeve and the anchor member.

According to the present invention a cylindrical block 25 of elastically deformable material such as rubber is fitted within the brake sleeve 15 and provided with a diametral slot 30 at one end to fit over the projections 21 and 22 of the anchor member 7 so that endwise compression of the rubber against the keys 16, 17 and the anchor member will cause radial expansion of the brake sleeve. For this purpose, an expanding member 26 is splined within the free end of the brake sleeve as by means of radial projections 27 engaging in slots 28 formed in the brake sleeve, which slots extend axially so as to accommodate the necessary longitudinal movement of the expander 26.

Means for actuating the expander is provided in the form of a nut member 29 mounted on the threaded portion of the driving member 2 and having on its opposite sides radial teeth 31 and 32 respectively. The expander 26 is provided on the side adjacent nut 29 with radial teeth 33 adapted to cooperate with the teeth 32 of the nut to prevent relative rotation between said parts when the nut is forced into engagement with the expander by backward rotation of the driving member. The teeth 31 on the nut are arranged to cooperate with the clutch teeth 14 in the interior of the hub 9 upon forward rotation of the driving member so as to transmit such rotation to the hub.

Means are provided for applying a slight frictional drag to the actuating nut 29 so as to insure its traversal upon rotation of the driving member. As shown in Fig. 2, this is accomplished by forming an arcuate slot 34 in the brake sleeve 15 near its free end so as to provide an elastic arm 35 which is bent inwardly to bear frictionally on the periphery of the actuating nut member. In the structure illustrated in Fig. 4 this function is accomplished by means of a spring ring 36 seated in a groove 38 in the periphery of the actuating nut. One end of the ring is bent inwardly as indicated at 37 to enter an opening 40 in the nut to anchor the ring to the nut. The other end of the ring is arranged to press against the interior of the brake sleeve to provide a light frictional connection therewith.

In operation, forward rotation of the driving member 2 by means of sprocket 5 causes the actuating nut member 29 to be threaded to the right in Fig. 1 until the clutch teeth 31 thereof engage the clutch teeth 14 in the hub 9. Thereafter the hub is rigidly connected to the driving member to rotate therewith. Should the operator cease rotating the driving member, the rotation of the hub 9 by the momentum of the vehicle causes the actuating member 29 to overrun sufficiently to disengage the clutch teeth 31, 14. If the operator rotates the driving member backward the actuating member 29 is traversed to the left by its threaded connection therewith, such traversal being ensured by the retarding action of the spring arm 35 of the brake sleeve. When the teeth 32 of the actuating member engage the teeth 33 of the expander 26, rotation of the actuating member is thereby positively prevented, and further backward rotation of the driving member causes the actuating member to move the expander 26 longitudinally so as to compress the rubber block 25 against the keys 16, 17 and the anchor member 7. This axial compression causes radial expansion of the rubber block which expands the brake sleeve 15 into frictional engagement with the surface 13 of the hub. The rotation of the hub is thus retarded by a braking effect which is dependent upon the backward force applied to the driving member by the operator.

Although certain structure has been shown and described in detail, it will be understood that various changes may be made in the design and arrangement of the parts without departing from the spirit of the invention as defined in the claims appended hereto.

I claim:

1. In a wheel hub brake, an axle, a driving member journaled thereon, an anchor member fixed on the axle in spaced relation to the driving member, a hub journaled on the driving and anchor members, an expansible brake member within the hub non-rotatably connected to the anchor member, a block of elastically deformable material within the brake member between the driving and anchor members, and means responsive to backward movement of the driving member for compressing the elastically deformable material axially so as to cause it to expand radially and press the brake member into frictional engagement with the interior of the hub.

2. A wheel hub brake as set forth in claim 1 including further, means for non-rotatably connecting the brake member to the anchor member while permitting movement of the brake member into and out of engagement with the hub.

3. A wheel hub brake as set forth in claim 1 in which the anchor member is provided with a flattened axial extension, and a segmental key member is non-rotatably connected to the brake member and arranged to bear on said extension so as to spline the brake member to the anchor member.

4. A wheel hub brake as set forth in claim 1 in which said means for compressing the elastically deformable material includes an expander thrust member splined to the brake member adjacent the driving member, and an actuating member threaded to the driving member and movable axially by backward rotation thereof to engage and actuate the expander member.

5. A wheel hub brake as set forth in claim 1 in which said means for compressing the elastically deformable material includes an expander thrust member splined to the brake member adjacent the driving member, and an actuating member threaded to the driving member and movable axially by backward rotation thereof to engage and actuate the expander member, said actuating member and hub having cooperating clutch surfaces arranged to be engaged upon forward rotation of the driving member to transmit said rotation to the hub.

6. A wheel hub brake as set forth in claim 1 in which said means for compressing the elastically deformable material includes an expander thrust member splined to the brake member adjacent the driving member, and an actuating member threaded to the driving member and movable axially by backward rotation thereof to engage and actuate the expander member, and means for applying a frictional drag to the actuating member to ensure its traversal upon rotation of the driving member.

7. In a hub brake an axle, an anchor member fixed thereon, a driving member journalled thereon comprising a screw shaft, a wheel hub journaled on the anchor and driving members having an internal cylindrical braking surface, an expansible brake sleeve in the hub non-rotatably connected to the anchor member, an expander member splined in the brake sleeve, a cylinder of elastically deformable material between the expander member and anchor member energized by compression therebetween to expand the brake sleeve into frictional engagement with the hub, and a nut member threaded on the screw shaft and movable thereby to engage and actuate the expander member.

8. A hub brake as set forth in claim 7 including further, means for applying a frictional drag to the nut to insure its traversal on rotation of the driving member.

9. A hub brake as set forth in claim 7 in which the nut is located within the brake sleeve, and a portion of the sleeve is arranged to bear frictionally on the nut to control its rotation.

10. A hub brake as set forth in claim 7 in which the hub and expander member are provided with clutch faces, and the nut is provided with clutch faces on the opposite sides thereof adapted to engage the clutch faces of the hub and expander member respectively.

11. A hub brake as set forth in claim 7 in which the hub and the expander member are provided with toothed clutch faces, and the nut is provided with similar clutch faces on the opposite sides thereof adapted to engage the clutch faces of the hub and expander member respectively, and the brake sleeve is provided with an elastic tongue adapted to bear frictionally on the periphery of the nut.

THEO C. SAYLES.

REFERENCES CITED

The following references are of record in the file of this patent:

UNITED STATES PATENTS

| Number | Name | Date |
|---|---|---|
| 2,303,041 | Glacy | Nov. 24, 1942 |
| 1,919,340 | Lyford | July 25, 1933 |